United States Patent [19]
McLaughlin

[11] 3,727,195

[45] Apr. 10, 1973

[54] METHOD AND SYSTEM FOR READ ONLY MEMORY

[75] Inventor: Thomas D. McLaughlin, San Jose, Calif.

[73] Assignee: O.R.O.M. Inc., San Jose, Calif.

[22] Filed: July 20, 1970

[21] Appl. No.: 56,468

[52] U.S. Cl. .340/173 LM, 340/173 LS, 340/173 SP, 350/151, 179/100.3 A

[51] Int. Cl. ............................................G11c 13/04

[58] Field of Search .................340/173 LM, 173 LS; 350/151, 159; 179/100.3 A

[56] References Cited

UNITED STATES PATENTS

| | | | |
|---|---|---|---|
| 3,448,458 | 6/1969 | Carlson et al. | 340/173 |
| 3,559,185 | 1/1971 | Burns | 340/173 |
| 3,569,944 | 3/1971 | Bigelow | 340/173 |
| 3,465,352 | 9/1969 | Carlson et al. | 346/76 |
| 2,477,640 | 8/1949 | Montague | 179/100.3 A |
| 3,438,050 | 4/1969 | Aschenbrenner | 340/173 LT |

*Primary Examiner*—Terrell W. Fears
*Attorney*—Flehr, Hohbach, Test, Albritton & Herbert

[57] ABSTRACT

A read only memory and a system and method for producing the read only memory. An optical writer which may be controlled by a magnetic medium such as tape or disc, computer or direct input by electro mechanical switching or keyboards, writes an optical master recording. A copier generates a plurality of copies of the master recording. Each of the copies is then utilized as a program or data store for an optical read only memory.

7 Claims, 5 Drawing Figures

THOMAS D. McLAUGHLIN
INVENTOR.

BY Flehr, Hohbach, Test, Albritton & Herbert
ATTORNEYS

THOMAS D. McLAUGHLIN
INVENTOR.

BY
Flehr, Hohbach, Test
Albritton & Herbert
ATTORNEYS

THOMAS D. McLAUGHLIN
INVENTOR.

BY

Flehr, Hohbach, Test, Albritton & Herbert
ATTORNEYS

METHOD AND SYSTEM FOR READ ONLY MEMORY

BACKGROUND OF THE INVENTION

This invention pertains to memories and more particularly pertains to read only memories suitable for credit card verification, inventory controls or for comparing any group or groups of digits or numbers.

The basic concept of a read only memory has evolved from the need for a digital storage device whose only function is to read out a fixed array of bits and which is controlled and accessed by a computer-compatible or self contained indexing system. Such a read only memory has wide application. Perhaps the widest present application for such a memory is in connection with credit card verification systems.

The proliferation of credit cards has led to a large number of problems for establishments, such as department stores or service stations, that typically make a large number of credit sales. Accounts become stale or credit cards are stolen or lost and it is necessary to inform the sales force in some manner of the account numbers of these "bad" credit cards. Typically such information is made available to the sales people in the form of printed lists of "bad" credit cards. It is, however, inconvenient, expensive and somewhat embarrassing to a customer, for a sales person to take time at each sale to check the credit card number against a printed list.

A read only memory in accordance with this invention can be utilized as an adjunct to a credit card imprinter for providing an automated, inexpensive and rapid means of verifying credit card numbers. Upon comparing the number on the credit card to the store of credit card numbers in the read only memory and finding coincidence, appropriate action can be taken. Typically, finding the number on the "bad" credit list would cause a red light to indicate specific action for the sales person. This type of almost instantaneous verification for credit cards would be very advantagious. Such a read only memory can also be used in controlling programs for small and medium sized computers or used in archival or inventory control files.

SUMMARY OF THE INVENTION

Accordingly, it is an object of this invention to provide a read only memory.

It is another object of this invention to provide an optical read only memory which does not require in-contact sensors or heads.

It is another object of this invention to provide a method and means for optically encoding and reading a disc.

It is another object of this invention to provide a method and system for producing inexpensive programs or data stores for read only memories.

It is another object of this invention to provide an optically encoded disc.

Briefly, in accordance with one embodiment of the invention, a writer which may be controlled by a magnetic medium such as tape or disc, computer or direct input by electro mechanical switching or keyboards, is adapted to optically record a master recording. A plurality of copies are made from the master recording. These copies form programs or data stores for a plurality of read only memories. The read only memories comprise apparatus for optically reading out the information contained on the programs or data stores.

Other objects and advantages of the present invention will appear from the following detailed description of an embodiment thereof taken in connection with the accompanying drawings.

DESCRIPTION OF THE PREFERRED EMBODIMENTS

Figure 1:
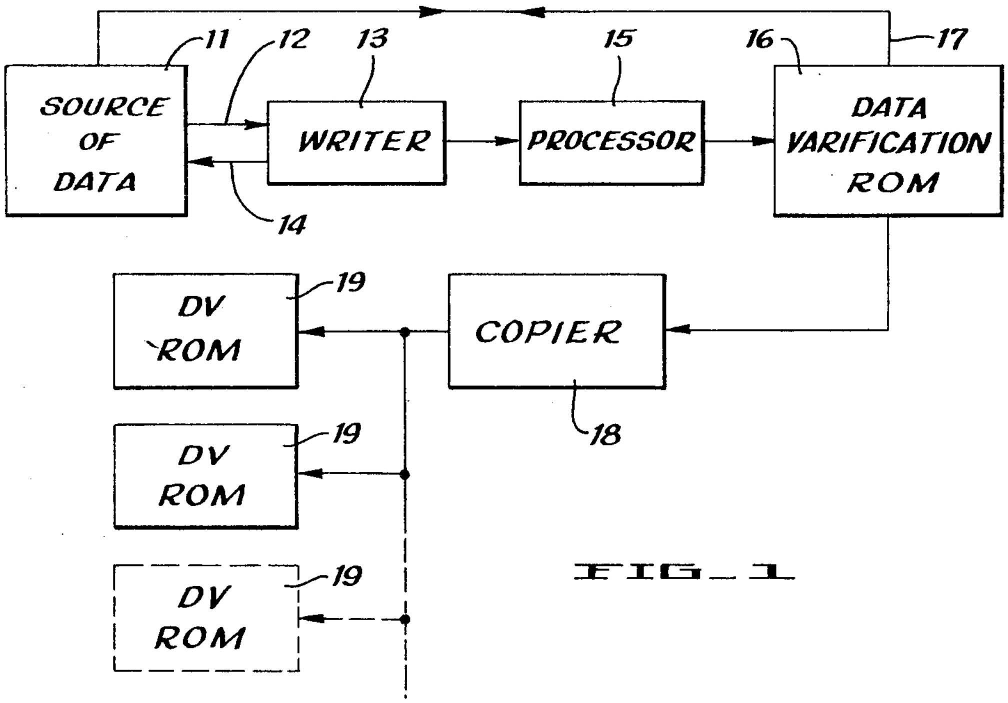
FIG. 1 shows a block diagram of a system and method for producing read only memories.

Referring now to FIG. 1, there is shown an overall system diagram of a plurality of read only memories and the necessary equipment and method of preparing data stores or programs for the read only memories. A source of data 11 is shown in FIG. 1 and may be a digital computer or other storage and control unit. This source of data 11 contains information or data which it is desired to transfer to a plurality of read only memories. This data can typically be digital information recorded on a magnetic tape or the like. The source of data 11 is connected via a circuit 12 to a writer 13. The writer 13 is a device required for the writing of a master recording, an original from which low cost copies are readily duplicated. The writer 13 is also connected to the source of data 11 by a circuit 14. The writer 13 provides positional information to the source of data 11 via circuit 14. The source of data 11, which it will be recalled is a computer or storage unit, then supplies the appropriate digital "0" or "1" to the writer 13 and this is written at the desired location.

Once all the data from the source of data 11 is recorded upon a master recording by the writer 13, the master recording is fixed or developed by a processor 15. After the master recording has been processed it is placed in a data verification read only memory 16 which is connected through circuit 17 to the source of data 11. The source of data 11 sequences a positive interrogation of all the recorded data and data verification read only memory 16 serves to verify the data recorded on the master recording.

The master recording which has been verified is then placed in a copier 18 which produces inexpensive copies of the master recording. These copies can be produced, for example, through contact printing or optically onto another film media. The film is not limited to light sensitive film but also may include heat sensitive film. The orientation and format of the data and the method of obtaining contact printing insure that the data is properly oriented for playback. If desired, the copies produced in copier 18, can be verified by a read only memory similar to data verification read only memory 16. However, no verification means for the copies is shown in FIG. 1.

The inexpensive copies produced in the copier 18 then form the input to a plurality of read only memories 19. The read only memories 19 are placed at remote locations and the copies produced by the copier 18 function as the program or data store for the read only memories 19. The copies are produced inexpensively and thus may be, for example, updated very often in accordance with changes in the data stored in the source of data 11. For example, a new master recording and new copies thereof for use with the remote read only memories 19 may be produced weekly or even daily.

Figure 2:
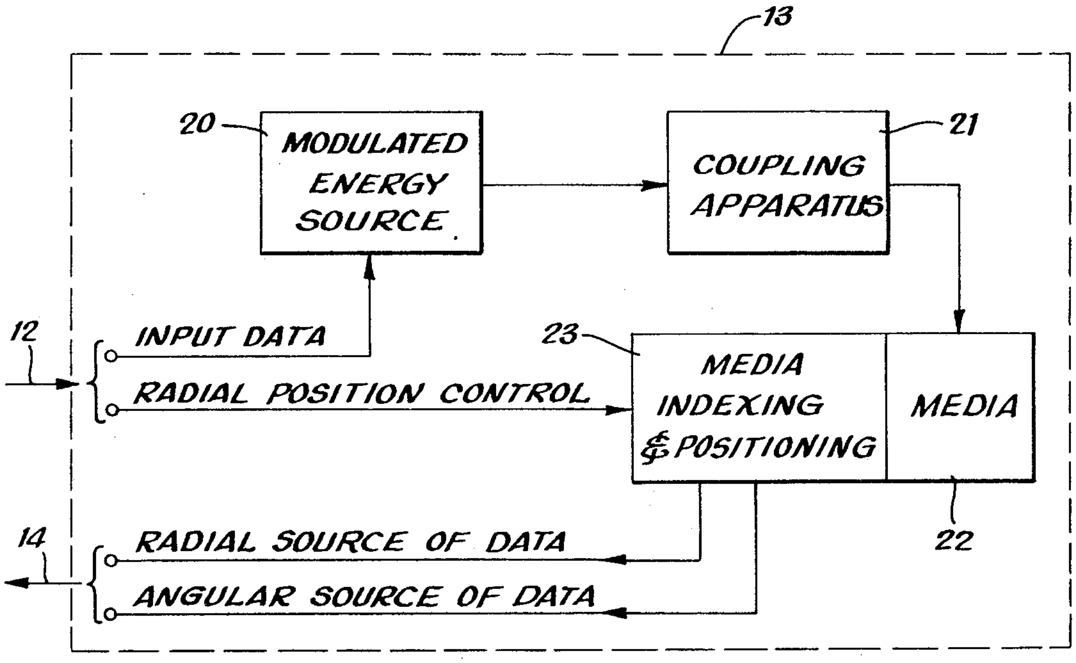
FIG. 2 is a schematic diagram of the writer of FIG. 1.

Referring now to FIG. 2 there is shown a functional diagram of one embodiment of the writer 13 of FIG. 1. Circuit 12 furnishes input data and radial position control signals from the source of data 11 to writer 13. The input data forms the input to a modulated energy source 20. The modulated energy source 20 can be anything which can produce a beam of energy capable of affecting a medium. For example, an electron beam modulated energy source may be used with a media which is affected by an electron beam. Alternately, and in accordance with one embodiment of this invention, modulated energy source is a polarized modulated laser. However, it should be appreciated that the modulated energy source may be any light source or modulation can be achieved electrically with crystals or mechanically such as by light chopping. Alternatively the modulated energy source may be radiation of any kind, including infrared or heat. The output of the modulated energy source 20 is coupled by coupling apparatus 21 to a media 22. Media indexing and positioning apparatus 23 receives a radial position control signal from the source of data 11 and controls the indexing and position of the media 22 with respect to the modulated signal to be applied to the media. The media indexing and positioning apparatus 23 provides outputs to the source of data along circuit 14 which are indicative of the radial source of data and the angular source of data.

Figure 3:
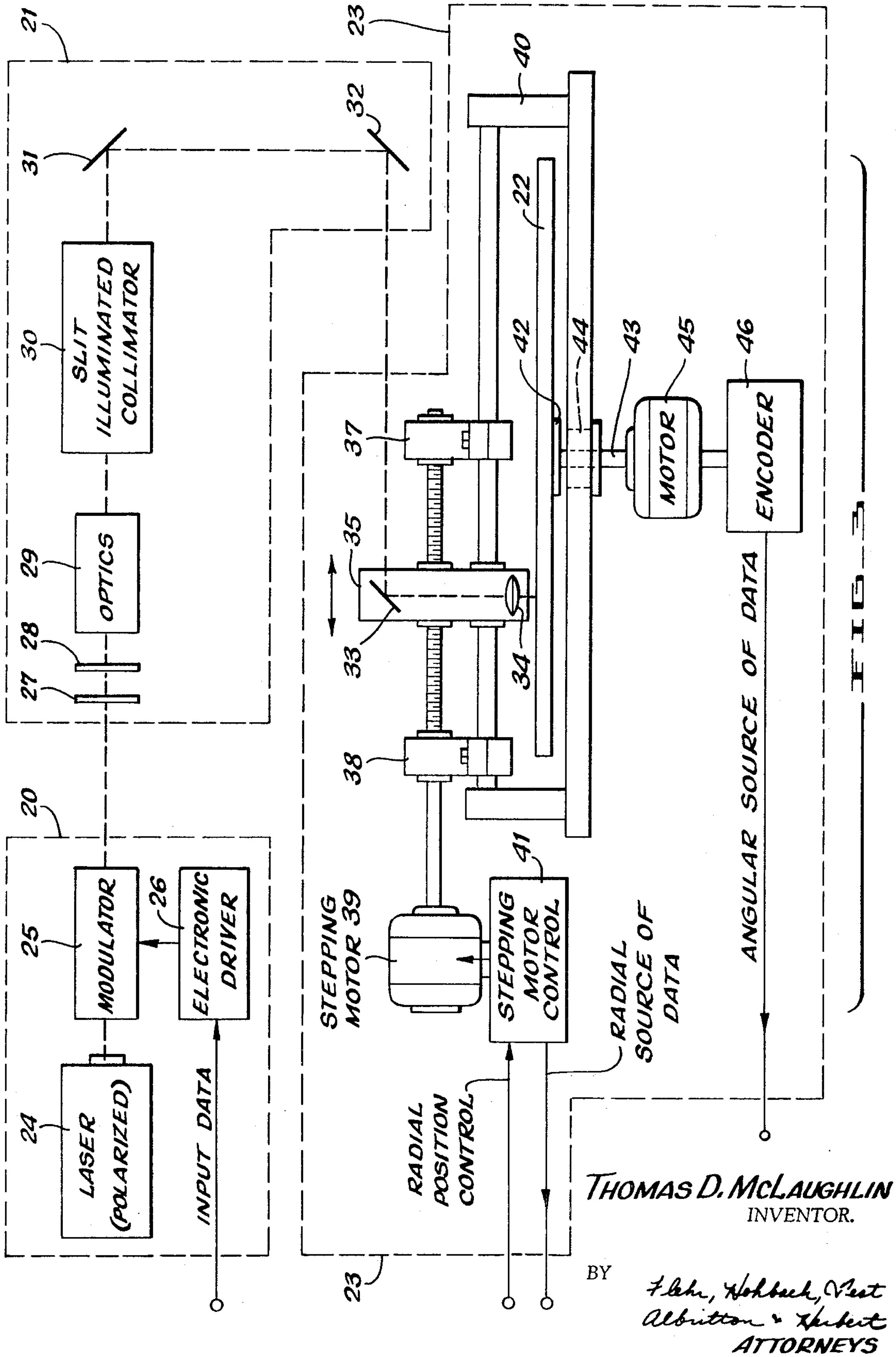
FIG. 3 is a more specific diagram of the writer of FIG. 2.

Referring now to FIG. 3, there is shown a more detailed schematic illustration of the writer 13 showing the manner in which data is recorded or written on the media 22. The input data forms the input to a modulated energy source 20 which comprises a laser 24, a modulator 25, and an electronic driver 26 for controlling the modulator 25. The modulator 25 may be any of the various suitable modulators that are well known in the art. One suitable modulator comprises an electro-optic crystal which rotates the polarization angle of light passing therethrough in response to the application of electric potentials to the electro-optic crystal. The modulated light output from the modulator 25 forms the input to coupling apparatus 21. Coupling apparatus 21 comprises a one quarter wave plate 27, a polarizer 28, optics 29, and a slit illuminated collimator 30.

The function of quarter wave plate 27 is to impose a bias on the light passing therethrough so as to account for birefringence which might be associated with the modulator 25. The output of the slit illuminated collimator 30 is a radially oriented modulated slit image. The output of the slit illuminated collimator 30 is coupled via mirrors 31, 32 and 33 into the media indexing and positioning apparatus 23.

The mirror 33 and a relay lens 34 are mounted in a housing 35 which is positioned adjacent the medium 22 upon which information or data is to be recorded. The housing 35 together with mirror 33 and relay lens 34 is mounted on a threaded shaft 36 which is mounted by bearing assembly 37 and 38 and which is driven by a stepping motor 39. The bearing assemblies 37 and 38 are mounted upon a frame 40. As the stepping motor 39 rotates the shaft 36 the housing 35 together with mirror 33 and relay lens 34 is radially indexed along a radius of the circular medium 22.

The stepping motor 39 is controlled by a stepping motor control circuit 41 which receives a signal from the source of data 11 entitled Radical Position Control which causes the stepping motor 39 to rotate the shaft 36 so as to index the housing 35 and mirror 33 and relay lens 34 to the proper circular track on the medium 22 on which data is to be recorded. The stepping motor control 41 also furnishes a signal entitled Radial Source of Data to the Source of Data 11 to verify the location of the housing 35 and relay lens 34.

The medium 22 is a medium that is compatible with the source of modulated energy that is being used. For example, if an electron beam is used then the medium should be a substance that undergoes a change of state under the influence of the modulated electron beam. According to one embodiment of this invention a polarized collimated laser beam is modulated and applied to the medium 22 and the medium 22 comprises a photo sensitive media, such as a diazo plate or photo sensitive silver content emulsion.

The media 22 is mounted upon a support 42 which is attached to a shaft 43 carried by a bearing 44 in the frame 40. The shaft 43 is rotated by a motor 45 which may be a synchronous, induction, DC or servo controlled motor. Regardless of which type of motor is utilized the motor rotates the support 42 and the media 22 and an encoder 46 which is connected to the motor shaft provides angular position information entitled Angular Source of Data in FIG. 3 which is furnished to the source of data 11. This information together with the radial source of data information supplied to the source of data 11 by the stepping motor control 41 provides the capability of placing data in the desired track and sector of the media 22.

In accordance with one important feature of this invention, utilization of a circular media 22 having a precision aperture in the center facilitates registration of the axis of the media 22. Radial and angular registration is ensured by the Radial and Angular Source of Data signals which are provided by the writer to the source of data 11.

Figures 4, 5:
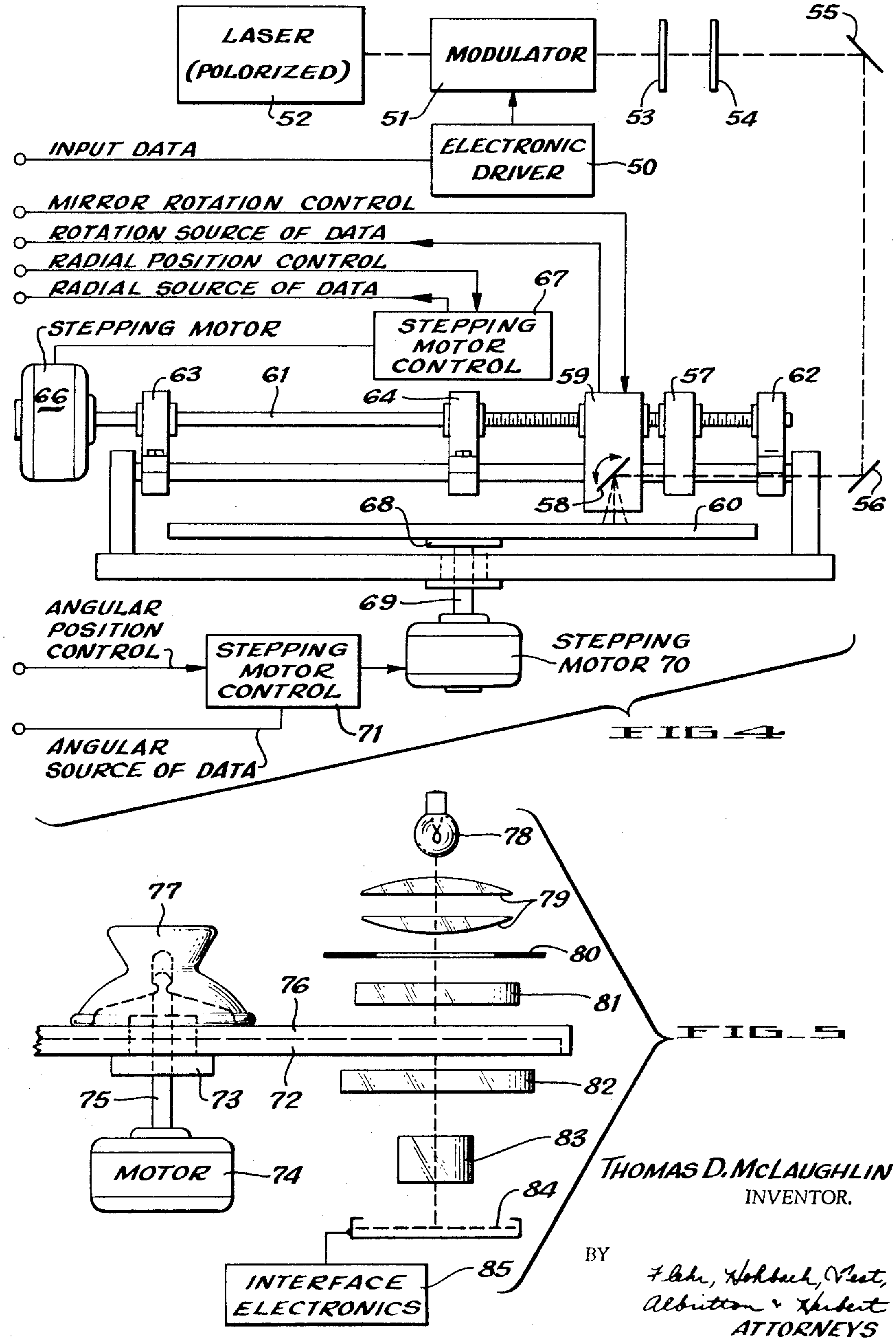
FIG. 4 is similar to FIG. 3 and is a diagram of another embodiment of a writer.
FIG. 5 is a functional diagram of a read only memory for use with the overall system of FIG. 1.

Referring now to FIG. 4 there is shown another embodiment for a writer 13. Input data from the source of data 11 forms an input to an electronic driver 50. The electronic driver 50 controls a modulator 51 which is situated in the path of a polarized laser 52. Suitable modulators and drivers are well known in the art and one specific embodiment of a suitable modulator 51 is an electro-optic crystal as discussed before. Modulated light leaving the modulator 51 passes through a one-quarter wave plate 53 and a polarizer 54. The purpose of the one-quarter wave plate 53 is to act as a sort of bias; that is, there will be some birefringence associated with the modulator 51, and the one-quarter wave plate 53 imposes a bias on the polarized light to eliminate the birefringence as a source of error. The light is then reflected by mirrors 55 and 56 to spot forming optics 57. The spot forming optics 57 focus the beam of light such that it will be in focus when reflected by a mirror 58, which is mounted in a rotating mirror assembly 59, onto the media 60. The rotating mirror assembly 59 is mounted upon a threaded shaft 61 which is mounted by bearing assemblies 62, 63 and 64 on a frame 65. The threaded shaft 61 is driven by a stepping motor 66 which is controlled by a stepping motor control 67. As the stepping motor 66 rotates, the shaft 61 together with the rotating mirror assembly 59 and spot forming optics are radially indexed along a radius of the circular media 60 to record a radial data track on the media 60.

The media 60 is mounted upon a support 68 which is attached to a shaft 69 which is driven by a stepping motor 70. The stepping motor 70 is in turn controlled by a stepping motor control 71. The stepping motor control 71 receives a signal entitled Angular Position Control from the source of data 11 and in response thereto controls the stepping motor 70 so that the media 60 is rotated to a desired radius upon which it is wished to write a radial data track. The stepping motor control 71 also supplies a signal entitled Angular Source of Data back to the source of data 11 to confirm the angular position of the media 60.

The stepping motor control 67 receives a signal from the source of data 11 entitled Radial Position Control and in response thereto controls the stepping motor 66 such that the rotating mirror assembly 59 and spot forming optics 57 are indexed to a desired position along a radius of the medium 60. The stepping motor control 67 also supplies a signal to the source of date 11 entitled Radial Source of Data, which serves to confirm the radial position of the rotating mirror assembly 59 along a radius of the media 60.

The rotating mirror assembly 59 contains the mirror 58 which is adapted to be rotated about an axis parallel to the plane of the medium 60. This rotation is controlled by a mirror rotation control signal received from the source of data 11. The mirror 58 is rotated so as to write various word lengths on the media 60. The scan angle of mirror 58 is limited by the depth of focus limitation of the spot size (formed by the spot forming optics 57) on the media. The rotating mirror assembly 59 supplies a signal entitled Rotation Source of Data to the source of data 11 for indicating the scanning operations of the mirror 58. The light beam exits from the spot forming optics 57 perpendicular to the axis of rotation of mirror 58 so that a straight line scan on media 60 is formed. In addition, the light beam is symmetrical about the line defining the axis of rotation so that the light beam, as reflected by mirror 58, progresses across the media 60 linearly with time. Stepping motor 66 drives the rotating mirror assembly 59 and spot forming optics 57 as a unit along a radius of the media 60 so that successive words are laid down on the same radius of medium 60 by rotation of the mirror 58. This invention also encompasses recording data in parallel. That is, data may be recorded in circular tracks on the media 60 instead of along radii thereof.

In operation, the data to be recorded is organized and addressed by the source of data 11 which, as discussed before, may be a computer. When the proper address is located as indicated by the radial source of data signal and the angular source of data signal, the light beam is modulated on or off for a time period determined by the rotation source of data signal supplied by the rotating mirror assembly 59 in order to provide the proper length of the recorded slit on the medium 60.

After all the desired data has been recorded upon the medium 60, which it will be recalled can be a diazo plate when visible light is used as the source of modulated radiant energy, the recorded information is fixed on the medium 60. In the case of a medium 60 comprising a photo sensetive silver contant emulsion, the fixing or processing step involves the standard development techniques such as recommended by film manufacturers such as Kodak for the specific emulsion being used. Normal developing equipment adapt to the handle the media size and shape are well known in the art and therefore will not be discussed here. It should also be apparent that other media may be utilized. These, for example, may include visible light, infrared, Xerox, diazo and heat sensitive media.

After processing there results a fixed master recording. This master recording is then copied in a copier. Suitable copying equipment is well known in the art and may operate on either optical, mechanical or thermal principles. For example, the copier is a device which through a centering spindle pushes a pre-cut disc of a material such as polyester with a diazo type coating with a coarsely centered precision hole into intimate contact with a master recording. The pre-cut disc is then exposed through the master recording to an energetic source of ultraviolet, such as a mercury arc lamp, for example. The exposed copy is then processed in a pressurized chamber containing ammonia. The ammonia is neutralized and evacuated and the copy is ready for verification. The copiers which presently exist in the art can produce 500 copies per hour using a single master recording. Through the use of a circular master recording and circular pre-cut discs on which copies are to be made, registration problems are to a large extent obviated. The centered precision hole in both the master recording and the pre-cut discs which are to be made into copies assure accurate alignment. Each of the copies is an accurate representation of the master recording and forms the program or data input to a read only memory.

A schematic illustration of a suitable read only memory in accordance with the principles of this invention is shown in FIG. 5. The read only memory comprises a transparent spindle 72 supported on a centering assembly 73. The centering assembly 73 and spindle 72 are rotated by a motor 74 having a shaft 75. A copy 76 of the master recording is placed on the transparent spindle 72 and registered in position by the centering assembly 73. A central hold down 77 is adapted to fit over the shaft 75 and hold the copy 76 tightly against the spindle 72.

A source 78 supplies energy, which in this example may be radiant visible energy such as from a projection lamp, to condensing lenses 79. The condensing lenses 79 may be similar to those used in slide projectors. A mask aperture 80 is provided in order to get rid of stray light and assist in making the illumination more uniform. This mask aperture is oriented to have a focused slit radially aligned along a radius of the copy 76. A lens 81 focuses the radial slit on a radius of the copy 76 and a field lens 82 situated on the opposite side of the copy 76 and transparent spindle 72 efficiently collects the radiate energy or light transmitted through the copy 76 and passes the light on to a relay lens 83. The relay lens 83 provides appropriate magnification for re-imaging onto a photo detector or transducer array 84 the light pattern passed by the copy 76. Magnification of this pattern is necessary because of the necessary physical dimensions of a photo detector array; that is, the pattern recorded on copy 76 has elements thereof closer together than photodetectors can be placed. Appropriate interface electronics 85 are provided to assemble and read out the information received by the photo detector array 84.

In operation, the motor 74 rotates the centering assembly 73 together with spindle 72 and copy 76 which contains the radially oriented data. The illumination or energy coming from the lens 81 interacts with the data on the copy 76. In the embodiment shown in FIG. 5 the arrangement or interaction is one of transmission or reduced transmission as the data on copy 76 interfers with the incident energy. Other interactions such as reflection or no-reflection can also be utilized. The field lens 82 and relay lens 83 image the interaction pattern on the photodetector array 84 in such a manner as to readily identify transmission or reduced transmission. This is accomplished by proper selection of the magnification of the relay optics and the similarity of aspect ratio of the recorded bit and the accessable photo detector array. The difference allows the interface electronics to interpret these variations as Zeros or Ones. Clock, sector and/or radius data points in conjunction with the interface electronics 85 control when data is read, clocked for comparison, relayed on or whatever other function is desired.

The photodetector array 84 may be either a head per track configuration or some suitable ratio thereof which can be related to word length along the radius; the head can be mechanically moved along the radius in a manner which is consistent with the desired results. By way of a specific example, there can be 29 bit words which can be a four bit code for six digit numbers, four bits for information concerning the six digit number and one bit for clocking the interface electronics 85. The radius is divided into ten groupings of 29 bits, each grouping containing all the desired six digit numbers starting with a particular digit 0 through 9. The mechanical mechanisms steps continuously through these 10 positions. Alternatively, the mechanism can index directly to the desired position.

Thus, many variations in the specifics of this invention are possible within the skill of persons familiar with the art, without departing from the true spirit and scope of the invention.

I claim:

1. A method of providing accessible data stores at a plurality of remote locations comprising the steps of optically writing digital information on a rotatable master recording along radial tracks thereof, photographically making a plurality of identical copies of said master recording whereby each of the copies contains the optically written digital information, and placing each of said plurality of copies respectively in each of a plurality of electronic remote read only memories capable of reading optically written digital information whereby each of said plurality of copies comprises an accessible data store.

2. In combination, an optical writer having an input and an output, means for connecting said optical writer input to a source of data, means for applying said optical writer output along radial tracks of a rotatable media to form a master recording having optically encoded data, means for photographically making a plurality of optically encoded identical copies of said master recording whereby each of said copies contains the optically encoded data, and a plurality of electronic optical read only memories, each of said read only memories adapted to read one of said plurality of copies.

3. A system for producing data stores for read only memories comprising an optical writer having an input and an output, means for connecting said optical writer input to a source of data and control signals, a circular master media upon which data may be optically recorded, means for coupling said optical writer output to said circular master media including indexing means aligned with a radius of said circular master media and adapted to index along the radius thereof in response to control signals, means for rotating said circular media with respect to said indexing means in response to control signals to align said indexing means along other radii of said circular media, reflecting means carried by said indexing means for coupling said optical writer output to said circular master media whereby data is recorded thereon, means for photographically making a plurality of copies of said circular master media with the recorded data thereon, with each of said copies comprising a data store for a read only memory.

4. The system of claim 3 wherein said reflecting means carried by said indexing means comprises a rotating mirror adapted to rotate about an axis perpendicular to the plane of said circular master media and symmetrical to a radius thereof and including means for rotating said mirror in response to control signals.

5. The combination of claim 2 wherein said media comprises a circular master disc having a centrally located alignment aperture with the optically encoded data positioned on the circular disc in predetermined spaced relationship to the centrally located alignment aperture, a plurality of circular disc blanks each having a centrally located alignment aperture for facilitating alignment of said circular disc blanks with said circular master disc during photographic copying of the optically encoded data on the circular master disc onto each of said circular disc blanks, and wherein each of said read only memories includes a spindle for cooperating with the alignment aperture of the circular disc blanks having the copied optically encoded data thereon for aligning the optically encoded data thereon with the read only memory.

6. The combination of claim 5 wherein the optically encoded data is positioned along radial tracks of said circular master disc and consequently the copies thereof.

7. The combination of claim 6 wherein the optically encoded data is positioned along circular tracks concentric with the alignment aperture of said circular master disc and consequently the copies thereof.

* * * * *